United States Patent
Li et al.

(10) Patent No.: US 12,469,281 B2
(45) Date of Patent: Nov. 11, 2025

(54) PROCESSING VIDEO CONTENT USING GATED TRANSFORMER NEURAL NETWORKS

(71) Applicant: QUALCOMM Incorporated, San Diego, CA (US)

(72) Inventors: Yawei Li, Erlenbach (CH); Bert Moons, Antwerp (BE); Tijmen Pieter Frederik Blankevoort, Amsterdam (NL); Amirhossein Habibian, Amsterdam (NL); Babak Ehteshami Bejnordi, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 458 days.

(21) Appl. No.: 17/933,840

(22) Filed: Sep. 20, 2022

(65) Prior Publication Data

US 2023/0090941 A1  Mar. 23, 2023

Related U.S. Application Data

(60) Provisional application No. 63/246,643, filed on Sep. 21, 2021.

(51) Int. Cl.
*G06V 20/40* (2022.01)
*G06V 10/77* (2022.01)
(Continued)

(52) U.S. Cl.
CPC .......... *G06V 20/41* (2022.01); *G06V 10/7715* (2022.01); *G06V 10/774* (2022.01);
(Continued)

(58) Field of Classification Search
CPC .. G06V 20/41; G06V 10/7715; G06V 10/774; G06V 10/82; G06V 20/46; G06V 20/49; G06V 20/40
See application file for complete search history.

(56) References Cited

U.S. PATENT DOCUMENTS

2019/0280694 A1* 9/2019 Obradovic ............ H03K 19/20
2022/0058452 A1* 2/2022 Zhang ................... G06T 1/0007
(Continued)

FOREIGN PATENT DOCUMENTS

CN 111860162 A * 10/2020 ........... G06F 18/214

OTHER PUBLICATIONS

"Transformers from Scratch | Peterbloem.nl." Peterbloem.nl, Aug. 18, 2019, peterbloem.nl/blog/transformers. Accessed May 7, 2025. (Year: 2019).*

(Continued)

*Primary Examiner* — John Villecco
*Assistant Examiner* — Kyla Guan-Ping Tiao Allen
(74) *Attorney, Agent, or Firm* — Patterson + Sheridan, L.L.P.

(57) ABSTRACT

Certain aspects of the present disclosure provide techniques and apparatus for processing a video stream using a machine learning model. An example method generally includes generating a first group of tokens from a first frame of the video stream and a second group of tokens from a second frame of the video stream. A first set of tokens associated with features to be reused from the first frame and a second set of tokens associated with features to be computed from the second frame are identified based on a comparison of tokens from the first group of tokens to corresponding tokens in the second group of tokens. A feature output is generated for portions of the second frame corresponding to the second set of tokens. Features associated with the first set of tokens are combined with the generated feature output into a representation of the second frame.

29 Claims, 9 Drawing Sheets

(51) Int. Cl.
  *G06V 10/774* (2022.01)
  *G06V 10/82* (2022.01)
(52) U.S. Cl.
  CPC .............. *G06V 10/82* (2022.01); *G06V 20/46* (2022.01); *G06V 20/49* (2022.01)

(56) References Cited

U.S. PATENT DOCUMENTS

2022/0108688 A1* 4/2022 Wang ............... G10L 15/063
2022/0374676 A1* 11/2022 Chen ............... G06N 3/0455

OTHER PUBLICATIONS

Han K., et al., "A Survey on Vision Transformer", Arxiv.Org, Cornell University Library, 201 Olin Library Cornell University Ithaca, NY 14853, Aug. 12, 2021, XP091024106, pp. 1-25.
Hu P., et al., "Temporally Distributed Networks for Fast Video Semantic Segmentation", 2020 IEEE/CVF Conference on Computer Vision and Pattern Recognition, IEEE, Jun. 13, 2020, XP033804694, pp. 8815-8824, Section 3, Section 4.
International Search Report and Written Opinion—PCT/US2022/076752—ISA/EPO—Jan. 13, 2023.
Khan S., et al., "Transformers in Vision: A Survey", Arxiv.Org, Cornell University Library, 201 Olin Library Cornell University Ithaca, NY 14853, Jan. 4, 2021, XP081852034, pp. 1-24.
Zeng Y., et al., "Learning Joint Spatial-Temporal Transformations for Video Inpainting", Arxiv.Org, Cornell University Library, 201 Olin Library Cornell University Ithaca, NY 14853, Jul. 20, 2020, XP081724236, 23 Pages, Abstract Section 3.1: Overall Design, Section 3.2: Embedding, Section 3.2: Matching, Section 3.3: Attending, Section 3.3: Optimization Objectives, Section 4.1.
Carion N., et al., "End-to-End Object Detection with Transformers", arXiv:2005.12872v3 [cs.CV], May 28, 2020, 26 pages.
Child R., et al., "Generating Long Sequences with Sparse Transformers", arXiv:1904.10509v1 [cs.LG], Apr. 23, 2019, 10 pages.
Dosovitskiy A., et al., "An Image is Worth 16×16 Words: Transformers for Image Recognition at Scale", ICLR 2021, arXiv:2010.11929v2 [cs.CV], Jun. 3, 2021, pp. 1-22.
Guo Z., et al., "Single Path One-Shot Neural Architecture Search with Uniform Sampling", ECCV 2020, arXiv:1904.00420v4 [cs.CV], Jul. 8, 2020, 16 pages.
Habibian A., et al., "Skip-Convolutions for Efficient Video Processing", arXiv:2104.11487v1 [cs.CV], Apr. 23, 2021, 11 pages.
Jang E., et al., "Categorical Reparameterization with Gumbel-Softmax", ICLR 2017 Conference, Cornell University Library, 201 Olin Library Cornell University, Ithaca, NY 14853, Aug. 5, 2017, XP080729237, pp. 1-13, arXiv:1611.01144v5, abstract; figures 1-5, p. 1, line 1-p. 8, last line.
Katharopoulos A., et al., "Transformers are RNNs: Fast Autoregressive Transformers with Linear Attention", Proceedings of the 37th International Conference on Machine Learning, Online, PMLR 119, arXiv:2006.16236v3, Aug. 31, 2020, 17 pages.
Kitaev N., et al., "Reformer: The Efficient Transformer", International Conference on Learning Representations (ICLR) 2020, Feb. 2020, pp. 1-12.
Liu Z., et al., "Swin Transformer: Hierarchical Vision Transformer Using Shifted Windows", arXiv:2103.14030v2 [cs.CV], Aug. 17, 2021, 14 pages.
Maddison C.J., et al., "The Concrete Distribution: A Continuous Relaxation of Discrete Random Variables", ICLR 2017 Conference, Cornell University Library, 201 Olin Library Cornell University Ithaca, NY 14853, arXiv:1611.00712v3 [cs.LG], Mar. 5, 2017, XP080729141, pp. 1-20, p. abstract; figures 1-4 p. 1, line 1-p. 9, last line.
Riquelme C., et al., "Scaling Vision with Sparse Mixture of Experts", arXiv:2106.05974v1 [cs.CV], Jun. 10, 2021, 43 pages.
Touvron H., et al., "Training Data-Efficient Image Transformers & Distillation through Attention", arXiv:2012.12877v2 [cs.CV], Jan. 15, 2021, pp. 1-22.
Vaswani A., et al., "Scaling Local Self-Attention for Parameter Efficient Visual Backbones", CVPR 2021, arXiv:2103.12731v3 [cs.CV], Jun. 7, 2021, pp. 1-15.

* cited by examiner

PROCESSING VIDEO CONTENT USING GATED TRANSFORMER NEURAL NETWORKS

CROSS REFERENCE TO RELATED APPLICATIONS

This application claims benefit of and priority to U.S. Provisional Patent Application No. 63/246,643, entitled "Object Detection in Video Content Using Gated Transformer Neural Networks" and filed on Sep. 21, 2021, which is assigned to the assignee hereof and herein incorporated by reference in its entirety as if fully set forth below and for all applicable purposes.

INTRODUCTION

Aspects of the present disclosure relate to machine learning and, more particularly, to using artificial neural networks to process video content.

In various cases, artificial neural networks can be used to process video content, such as identifying objects in captured video content, estimating poses of persons detected in video content, or semantically segmenting video content, and perform various operations based on identifying objects in the captured video content. For example, in autonomous vehicle applications, artificial neural networks can be used to identify obstacles or other objects in the path in which an autonomous vehicle is traveling, and the identification of these obstacles or objects can be used to control the vehicle so as to avoid a collision with these obstacles or objects (e.g., by maneuvering around these obstacles, stopping before impact with an object, etc.). In surveillance applications, artificial neural networks can be used to detect motion in a surveilled environment.

Generally, video content may be defined in terms of spatial and temporal dimensions. Motion over time may be detected in the temporal dimension based on detected changes in the pixel values at a given spatial location in the video content. For example, background content may remain static or substantially static over the temporal dimension; however, as (non-camouflaged) objects move over the temporal dimension, the spatial locations of these objects may change. Thus, motion into an area may be visualized as a change from a static pixel value to a pixel value associated with the object; likewise, motion out of an area may be visualized as a change from a pixel value associated with the object to a different pixel value (e.g., corresponding to a background value).

Various types of neural networks can be used to process visual content, such as video content. For example, convolutional neural networks or transformer neural networks (e.g., a detection transformer ("DETR") or sliding window ("swin") transformer) can be used to detect objects in visual content, semantically segment visual content into different portions (e.g., foreground and background segments, static and non-static segments, etc.), and/or predict future motion of objects (e.g., perform pose prediction for multi jointed objects) in visual content. However, these neural networks may process visual content on a per-image basis and may not take into account redundancies in the visual content (e.g., spatially or temporally), which may be an inefficient use of compute resources (e.g., processor cycles, memory, etc.).

Accordingly, what is needed are improved techniques for object detection in video content.

BRIEF SUMMARY

Certain aspects provide a method for detecting objects in a data stream using a machine learning model. An example method generally includes extracting first features from a first segment of the data stream and second features from a second segment of the data stream. The first features and the second features are concatenated into a combined representation of the first segment of the data stream and the second segment of the data stream. Unchanged content and changed content are identified from the combined representation of the first segment of the data stream and the second segment of the data stream. A feature output for the second segment of the data stream is generated from the first features and the second features based on the identified unchanged content and the identified changed content. Using a transformer neural network, a plurality of objects in the data stream are identified based on the feature output for the second segment of the data stream. One or more actions are taken based on identifying the plurality of objects in the data stream.

Certain aspects provide a method of processing a video stream using a machine learning model. An example method generally includes generating a first group of tokens from a first frame of the video stream and a second group of tokens from a second frame of the video stream. A first set of tokens associated with features to be reused from the first frame and a second set of tokens associated with features to be computed from the second frame are identified based on a comparison of tokens from the first group of tokens to corresponding tokens in the second group of tokens. A feature output is generated for portions of the second frame corresponding to the second set of tokens. Features associated with the first set of tokens with the generated feature output for the portions of the second frame corresponding to the second group of tokens are combined into a representation of the second frame of the video stream.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of various aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
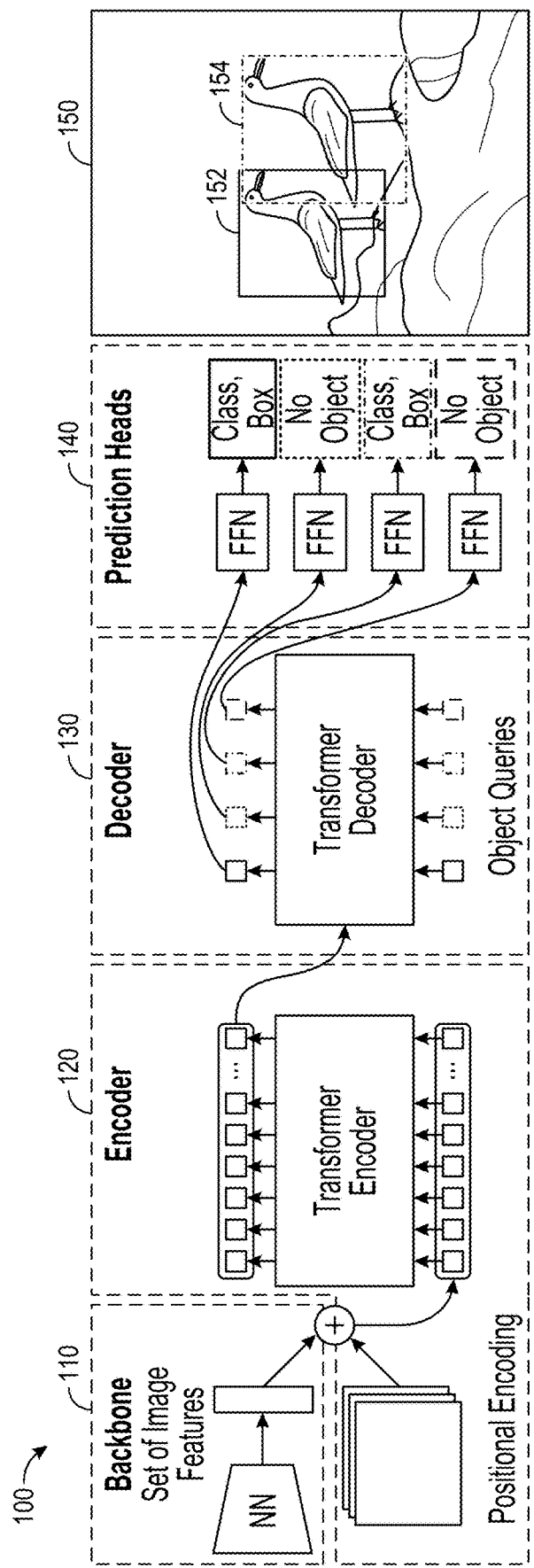
FIG. 1 depicts an example machine learning pipeline for object detection in visual content.

Aspects of the present disclosure provide techniques for efficiently processing visual content (e.g., efficient object detection) using transformer neural networks.

Various types of neural networks can be used to process (e.g., detect objects, predict future motion of objects detected in visual content, segment visual content into different semantic groups, etc.) visual content, such as still images or streams of visual content (e.g., video content captured as a series of images at a given frame rate, such as 24 frames per second, 29.97 frames per second, 60 frames per second, etc.). However, these neural networks generally process visual content on a per-frame basis, which may be a computationally expensive process that increases in complexity as the frame size of each frame in the visual content increases.

Generally, transformer neural networks may allow for long-range dependencies in sequential data to be modeled, which may reduce the length of a sequence and reduce the computational expense of attention layers. This, in turn, may cause the linear projection and feed-forward network (FFN) components of a transformer neural network to become a computational bottleneck, and thus, techniques that attempt to improve the efficiency of attention mechanisms may have limited effect on the computational efficiency of these transformer neural networks.

To improve the efficiency of neural networks, redundancies in visual content may be leveraged. Leveraging these redundancies may reduce the computational expense involved in processing visual content. Generally, a stream of visual content, such as a video, may have both spatial and temporal redundancy. Spatial redundancy generally refers to portions of video content that are irrelevant, or are minimally relevant, for a given task (e.g., object detection). For example, for images captured by cameras in an autonomous vehicle, the sky portions in captured visual content may be irrelevant to detecting objects for collision avoidance; however, these neural networks may still process the sky portions in the captured visual content, which may be an inefficient use of computing resources. Temporal redundancy generally refers to temporal correlation between subsequent video frames. Generally, large portions of subsequent video frames in captured visual content may include the same information, such as the same content in the background of these frames, stationary objects in the foreground of these frames, or the like. Using the autonomous vehicle example again, changes may be detected only in a portion of subsequent video frames as an object moves over time. Once again, however, these neural networks may not discriminate between the portions of an image that have changed and the portions of the image that remain unchanged in performing object detection or other computer vision tasks, and thus may use computing resources in processing both the unchanged and changed portions of these images. This may be an inefficient use of computing resources (e.g., processor cycles, memory, etc.) and may result in delays in completing object detection tasks, high power utilization, and the like.

Some neural network architectures can be configured to leverage one type of redundancy to improve the efficiency and performance of object detection and other computer vision tasks that use neural networks. For example, transformer neural networks can be configured to take advantage of spatial redundancy alone in performing object detection tasks on a per-frame basis. In another example, a skip convolution technique may be used to re-compute features for portions of an image that have changed, relative to a predecessor image. However, neural networks configured to leverage spatial redundancy may still process video content on a frame-independent basis, and neural networks configured to leverage temporal redundancy may still process redundant, or irrelevant, portions of successive images.

Aspects of the present disclosure provide techniques and apparatus that allow for object detection and other computer vision tasks using neural networks that leverage both spatial and temporal redundancy. As discussed in further detail herein, by using both spatial and temporal redundancy to process successive segments of a data stream, such as successive frames in video content, aspects of the present disclosure may reduce the amount of data to be processed by a neural network to perform object detection or other computer vision tasks. Thus, fewer compute resources may be utilized to complete these object detection or other computer vision tasks, which may reduce the amount of power used by computing devices to perform these tasks and accelerate processing of streaming content, relative to the amount of power and time used when spatial and temporal redundancies are not leveraged in performing these tasks.

Example Machine Learning Pipeline for Efficient Processing of Visual Content FIG. 1 depicts an example machine learning pipeline 100 for object detection in visual content. As illustrated, machine learning pipeline 100 includes a backbone 110, encoder stage 120, decoder stage 130, and prediction heads stage 140, and the pipeline is configured to generate an output 150 including information about objects detected in an image input into the machine learning pipeline 100.

Backbone 110, as illustrated, extracts a set of features from an input image using a neural network (e.g., a transformer neural network, such as a DETR or a swin transformer). The set of features may be flattened and passed to encoder stage 120. Positional information may be combined with the set of features extracted by backbone 110, and the combined set of features and positional information may be processed by a transformer encoder in encoder stage 120. In some aspects, the features extracted by backbone 110 may be features associated with each of a plurality of spatial segments in the input image. The spatial segments may be sized based on an amount of data to be considered in generating the set of features describing the input image. Generally, larger spatial segments (e.g., including a larger number of pixels, or encompassing a larger portion of the input image) may include more data to be compressed into a single feature representation, which may reduce the number of features to be processed in machine learning pipeline 100, at the expense of some fidelity in analysis. Meanwhile, smaller spatial segments (e.g., including a smaller number of pixels, or encompassing a smaller portion of the input image) may allow for more granular analysis of the input image through the generation of a larger number of features to be processed in machine learning pipeline 100, at the expense of increased computational complexity.

Encoder stage 120 is generally configured to encode the features extracted by backbone 110 into a latent space representation of the features. Various attention mechanisms can be used at encoder stage 120 to emphasize certain features from the set of features generated by backbone 110. The output of encoder stage 120 may be provided as input into decoder stage 130, which decodes the features into one of a plurality of categories. As illustrated, the decoder stage 130 includes a transformer decoder configured to take, as input, encoded features of an input image from encoder stage 120, including positional information associated with these encoded features. The transformer decoder in decoder stage 130 generally attempts to output a prediction associated with each encoded feature received from encoder stage 120.

The predictions generated at decoder stage 130 may be provided into prediction heads stage 140, which ultimately may predict or otherwise identify the presence of various objects in the input image. A feed-forward network may be used to determine whether an object is present at a given portion of the input image (e.g., associated with a given feature generated by backbone 110 for a given spatial location in the input image). If a feed-forward network at predictions head stage 140 predicts that an object is present at a given spatial location in the input image, further processing may be performed to determine the type of object located at that given spatial location in the input image.

In this example, pipeline 100 may generate classifications 152 and 154 for a given input image. Classifications 152 and 154 may correspond to different objects of interest in the input image. In this example, the objects of interest are the two birds shown in the input image, and classifications 152 and 154 may correspond to bounding boxes (of any shape) in which the objects of interest are located in the input image.

Pipeline 100 generally allows for objects to be identified in individual images. However, because pipeline 100 uses a convolutional neural network in backbone 110 to extract features from an input image, pipeline 100 may not be able to leverage both spatial and temporal redundancy in streaming content to efficiently identify objects or perform other computer vision tasks using streaming content.

Figure 2:
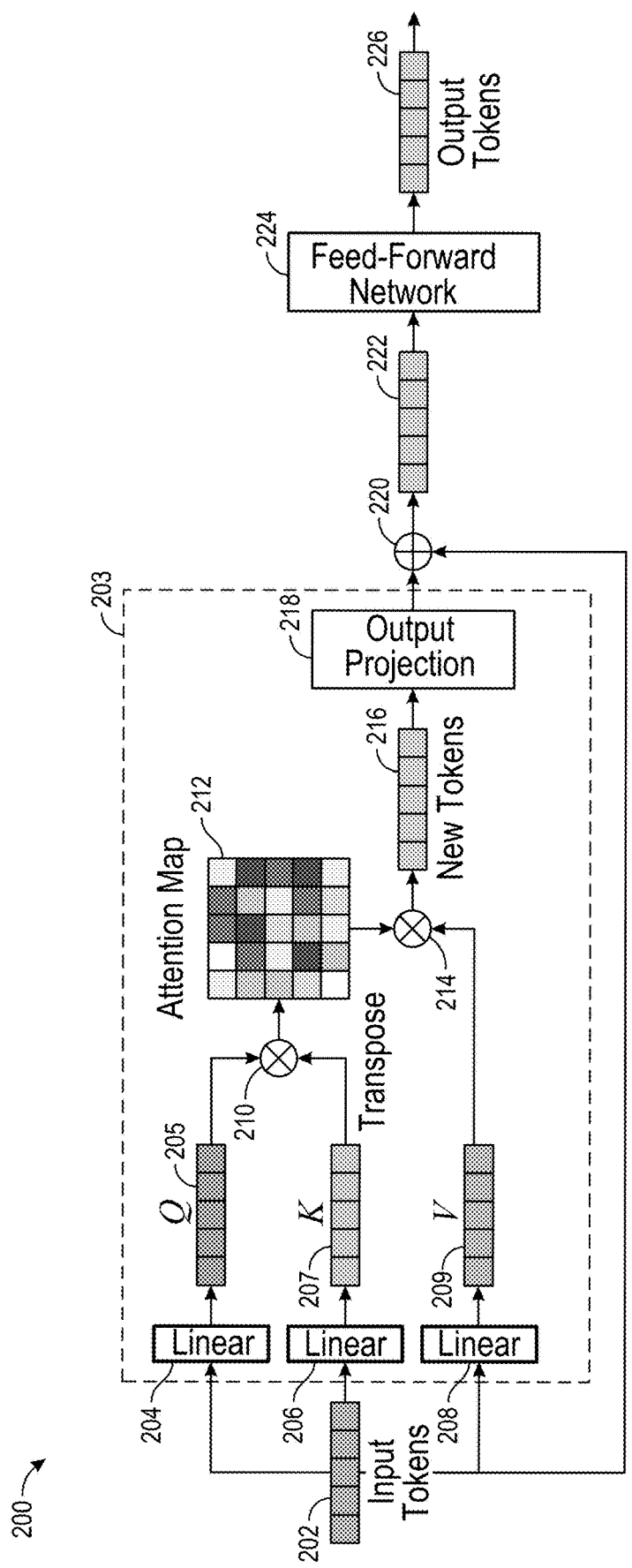
FIG. 2 depicts an example transformer neural network used for detecting objects in visual content.

FIG. 2 illustrates an example transformer neural network 200 that may be used to detect objects in visual content or perform other computer vision tasks. Generally, transformer neural network 200 includes a self-attention module that models dependencies between different input tokens (e.g., different portions of an input image) and a feed-forward network that deepens the feature representation.

As illustrated, transformer neural network may receive, as input, a set of input tokens 202. Tokens in the set of input tokens 202 may correspond to features extracted from different spatial locations within an input image. The set of input tokens may be represented as a sequence:

$$\chi = \{x_i \in \mathbb{R}^d | i=1, \ldots, N\} \quad (1)$$

where N denotes the number of tokens and d denotes an embedding dimension for the space in which tokens can be generated. The sequence of tokens may be assembled into a matrix $X = \mathbb{R}^{N \times d}$. For computer vision tasks based on images, the input sequence may be converted from an input image I represented by the equation:

$$I \in \mathbb{R}^{C \times H \times W} \quad (2)$$

where C denotes the channel (e.g., red, green, blue, or alpha (transparency) channels in RGB images; cyan, yellow, magenta, and black channels in CYMK images, etc.), H denotes the height, and W denotes the width of the input channel.

A self-attention module 203 in transformer neural network 200 generally includes a plurality of linear projection layers 204, 206, 208, an attention map 212, and an output projection layer 218. The linear projection layers 204, 206, and 208 may be configured to convert the set of input tokens 202 into a triplet of queries Q 205, keys K 207, and values V 209, respectively. That is, a triplet Y may be represented by the equation $$Y = XW_Y + B_Y \quad (3)$$

where $Y \in \{Q, K, V\}$, $W_Y \in \mathbb{R}^{d \times d}$, $B_Y \in \mathbb{R}^d$.

To generate attention map 212, queries Q 205 and keys K 207 may be combined at matrix multiplier 210, which may compute similarities between the queries Q 205 and keys K 207 and normalize the similarities based on a softmax function, for example. The attention map 212 and values V 209 may be combined by matrix multiplier 214 to generate a set of new tokens 216. The set of new tokens 216 may be computed as the weighted sum of the values V 209 with respect to the attention map 212. The set of new tokens 216 may be represented by the equation:

$$X_a = \text{Softmax}\left(\frac{QK^T}{\sqrt{d}}\right)V$$

where the softmax function is applied to rows of a similarity matrix (e.g., attention map 212) and d is a normalization factor. Output projection layer 218 may be applied to the set of new tokens 216, resulting in a set of tokens 222 represented by the equation:

$$X_O = X_a W_o + B_o \quad (5)$$

where the set of tokens 222 comprises the sum, calculated at adder 220, of the input tokens and the output of output projection layer 218.

The set of tokens 222 may then be processed by a feed-forward network 224, which may include a multi-layer perceptron (MLP) with two fully connected layers. Generally, the MLP may deepen the feature representation and may widen a hidden embedding dimension between the two fully connected layers. The output tokens 226 generated by feed-forward network 224 may be represented by the equation $$X_{FFN} = f((X_o W_1 + B_1)W_2) + B_2 \quad (6)$$

where $W_1 \in \mathbb{R}^{d \times yd}$, $W_2 \in \mathbb{R}^{yd \times d}$, $B_1 \in \mathbb{R}^{yd}$, $B_2 \in \mathbb{R}^d$, and $f(\cdot)$ denotes a non-linear activation function.

A computational analysis of transformer neural network 200 illustrates the computational expense of various components in the transformer neural network 200. Within a backbone of a neural network architecture (e.g., backbone 110 illustrated in FIG. 1 and discussed above)—which may be the most computationally complex layer within an overall object detection pipeline—it may be seen that the linear projection layers 204, 206, and 208 consume about 29 percent of the total number of floating point operations in the pipeline, attention computation (represented by equation (4) discussed above) consumes about 3 percent of the total number of floating point operations in the pipeline, and the feed-forward network consumes about 52 percent of the total number of operations in the pipeline. The remainder of the floating point operations in the pipeline may be consumed by the encoder stage and decoder stage of the pipeline (e.g., encoder stage 120 and decoder stage 130 illustrated in FIG. 1 and discussed above). Thus, it may be seen that attention computation is a computationally inexpensive process, while the generation of query Q 205, keys K 207, and values V 209 through the linear projection layers 204, 206, and 208, respectively, can be a computationally expensive process.

In the self-attention module 203 in transformer neural network 200, computation is distributed to the linear projection layers 204, 206, and 208, and the matrix multiplier 210 used to generate attention map 212. The computational complexity of the linear projection layers 204, 206, and 208 may be calculated as $3Nd^2+Nd^2=4Nd^2$, and the computational complexity of the matrix multiplication at matrix multiplier 210 may be calculated as $2N^2d$. The ratio of the complexity of the matrix multiplication at matrix multiplier 210 to the linear projection layers 204, 206, and 208 may be represented by the equation:

$$\gamma = \frac{2N^2d}{4Nd^2} = \frac{1}{\frac{2d}{N}+1} \quad (7)$$

When a sequence of tokens is long, and the value of N is large, the attention computation performed by self-attention module 203 may become a computational bottleneck.

Example Gated Transformer Neural Network for Object Detection in Visual Content

To improve the efficiency of transformer neural networks used to detect objects in data streams and/or perform other computer vision tasks, aspects of the present disclosure may use gating mechanisms to exploit temporal and spatial redundancy in a data stream, such as video content, to reduce the amount of data processed in a transformer neural network. As discussed in further detail below, gating mechanisms may be applied to linear layers in a transformer neural network (e.g., layers 204, 206, 208 illustrated in FIG. 2 and described above), an output projection layer 218, and/or a feed-forward network 224. As discussed in further detail below, the gating mechanisms can be used to identify changed and unchanged content in successive segments in a data stream, such as successive frames in video content, and use the identification of the changed and unchanged content between the successive segments to determine which sub-segments of a segment of the data stream should be recomputed. For example, video content can be divided into: (1) background content, which may be static content, and (2) foreground content which may change over time. The gating mechanisms discussed in further detail herein may allow for redundant information, both in the spatial and temporal domains, to be transferred from feature outputs generated for earlier segments in a data stream to later segments in the data stream. By doing so, features need not be recomputed for spatially and temporally redundant information, which may reduce the computational expense, power utilization, and computing resource utilization involved in object detection or other computer vision tasks using transformer neural networks.

Figure 3:
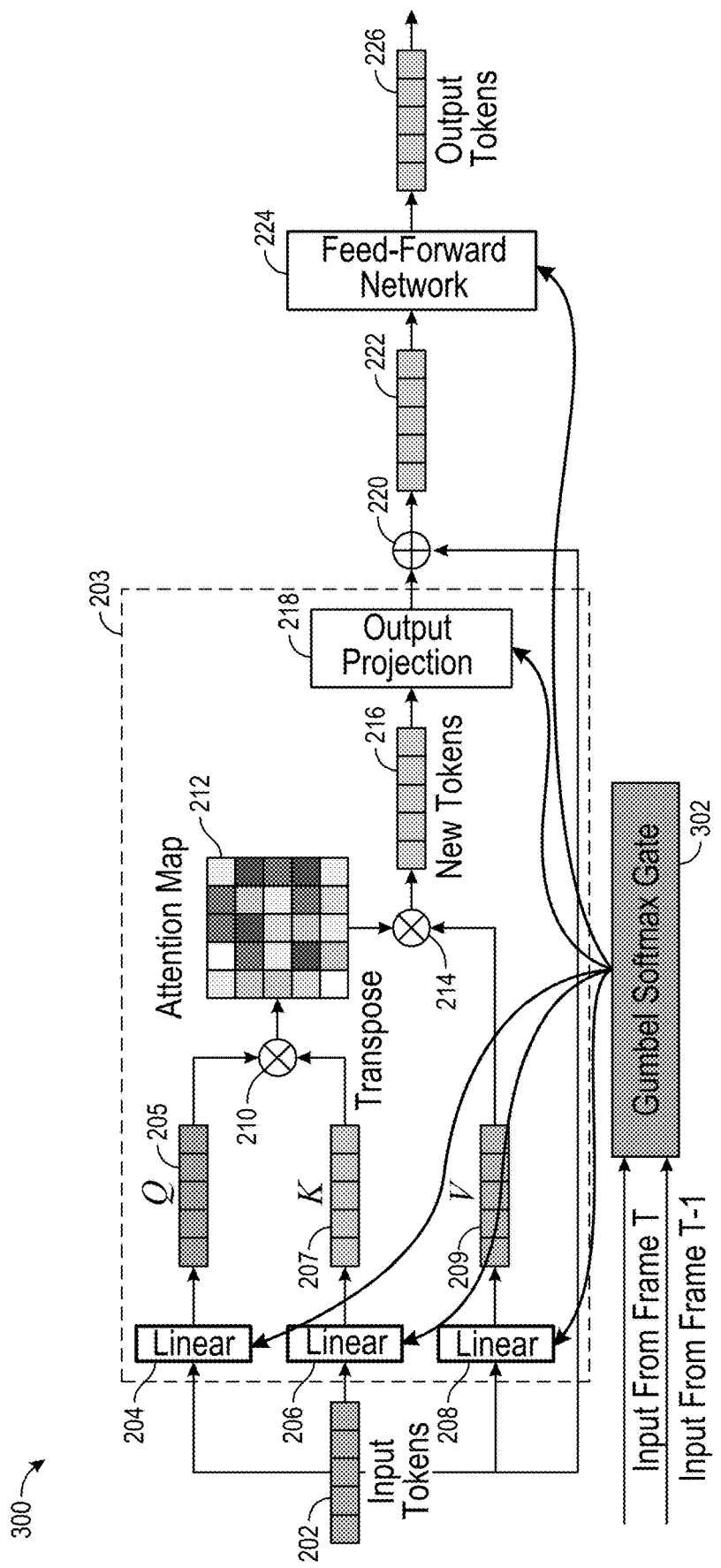
FIG. 3 depicts an example gated transformer neural network for efficient detection of objects in visual content, according to aspects of the present disclosure.

FIG. 3 illustrates an example of a gated transformer neural network 300 for efficient detection of objects in visual content, according to aspects of the present disclosure. As illustrated, the structure of the gated transformer neural network 300 may retain structure of the transformer neural network 200 illustrated in FIG. 2, and may introduce a gate 302 that is coupled to linear projection layers 204, 206, and 208, output projection layer 218, and feed-forward network 224 to allow for information to be shared between successive segments of a data stream. As discussed in further detail below, gate 302 may be a binary gate that is used to determine whether to use a previously computed feature from a previous segment in a data stream or to compute a feature from a current segment in the data stream, or a ternary gate that is used to determine whether to use a previously computed feature from a previous segment in a data stream, to compute a feature from a current segment in the data stream, or to zero out the computed feature. Generally, zeroing out a feature may halt computation of features for a specific sub-segment of a segment in a data stream (e.g., spatially redundant data in video content) for each of the remaining segments of the data stream, which may reduce the size of an attention map and reduce the number of features for which computation is to be performed. Sharing a previously computed feature from an earlier segment of a data stream to a later segment of the data stream may allow for computation expense to be reduced in processing a current segment of the data stream.

In some aspects, binary gating can be used to improve the efficiency of the feed-forward network 224 in gated transformer neural network 300. When coupled to a feed-forward network 224, zeroing out a feature and copying a previously computed feature from a previous segment of a data stream may result in a similar or same reduction in computational expense (e.g., number of floating point operations (FLOPs) executed during processing of a segment in the data stream). Because zeroing and copying a previously computed feature may be functionally equivalent, a simpler gating structure (e.g., with fewer states) can be used.

In some aspects, ternary gating can be used to improve the efficiency of the query, key, and value (QKV) computation performed by linear projection layers 204, 206, and 208 in gated transformer neural network 300. Zeroing out a feature at the linear projection layers 204, 206, and 208 may result in an overall reduction in computational expense in the self-attention module 203, as zeroing out a feature may remove that feature from further computation and reduce the number of features to be computed (and potentially recomputed) by the gated transformer neural network 300.

Figure 4:
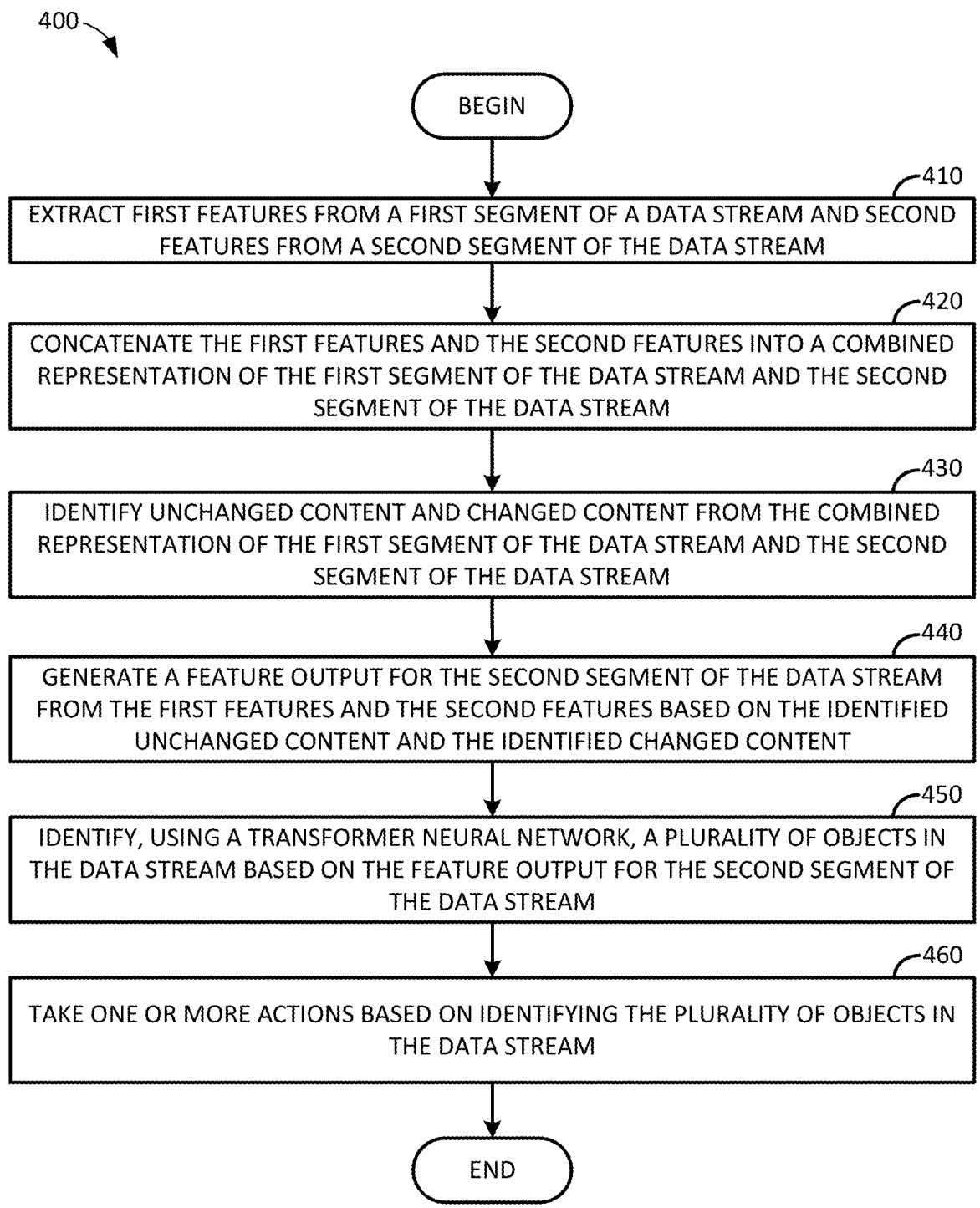
FIG. 4 depicts example operations for efficient detection of objects in visual content using a gated transformer neural network, according to aspects of the present disclosure.

FIG. 4 illustrates example operations 400 for efficient detection of objects in visual content using a gated transformer neural network, according to aspects of the present disclosure. Operations 400 may be performed, for example, by a computing device on which a gated transformer neural network (e.g., gated transformer neural network 300 illustrated in FIG. 3) is deployed for use in various computer vision tasks.

As illustrated, operations 400 begin at block 410, where first features are extracted from a first segment of a data stream and second features are extracted from a second segment of the data stream. Generally, each feature of the first features may represent different spatial portions of the first segment of the data stream, and each feature of the second features may represent different spatial portions of the second segment of the data stream. The first segment of the data stream may represent data captured at a first point in time, and the second segment of the data stream may represent data captured at a second point in time that is later than the first point in time. For example, the data stream may be a video data stream having a plurality of frames. The first segment of the data stream may comprise a first frame of the plurality of frames in the video data stream (e.g., a frame at time t), and the second segment of the data stream may comprise a second frame of the plurality of frames in the video data stream having a later timestamp than the first frame (e.g., a frame at time t+1).

In some aspects, to extract the first features from the first segment of the data stream, the first segment of the data stream may be divided into a plurality of sub-segments. For each respective sub-segment of the first segment of the data stream, a feature representation of the data in the respective sub-segment can be extracted using a neural network (e.g., a transformer neural network). Similarly, the second segment of the data stream may be divided into a plurality of sub-segments, and for each respective sub-segment of the second segment of the data stream, a feature representation of the data in the respective sub-segment can be extracted using the neural network. Generally, a given sub-segment of the first segment of the data stream may correspond to a sub-segment of the second segment of the data stream at a same spatial location in the data stream.

At block 420, the first features and the second features are concatenated into a combined representation of the first segment of the data stream and the second segment of the data stream. Generally, the concatenation of these features may allow the features extracted from the first segment of the data stream and the second segment of the data stream to be combined for use in identifying changed content and unchanged content between the first segment of the data stream and the second segment of the data stream. For example, concatenating features into a combined representation may include averaging the value of each feature, calculating a difference between each feature, or other operations that can be used to mathematically combine the first features and the second features.

At block 430, unchanged content and changed content are identified from the combined representation of the first segment of the data stream and the second segment of the data stream. Various techniques may be used to identify changed and unchanged content from the combined representation. For example, a difference between an averaged feature value for a given spatial location and the feature value for the given spatial location in the second segment of the data stream can be calculated. If the difference is outside a threshold level, it may be determined that the given spatial location includes changed content for which features are to be recomputed through the transformer neural network. Otherwise, it may be determined that the given spatial location includes unchanged content. In another example, where the combined representation includes a difference between feature values from the first segment of the data stream and corresponding feature values from the second segment of the data stream, the difference value for a given feature, corresponding to a given spatial location, can be analyzed. If the difference value for a given feature exceeds some threshold value, it can be determined that the given spatial location associated with the given feature includes changed content; otherwise, it can be determined that the given spatial location associated with the given feature includes unchanged content.

In some aspects, where the data stream comprises a video data stream having a plurality of frames, the unchanged content and changed content may be content on different depth planes (e.g., background or foreground) in different frames. Unchanged content may be, for example, background content that is shared between a first frame of the video data stream and a second frame of the video data stream. Changed content, meanwhile, may be foreground content that changes between the first frame and the second frame.

At block 440, a feature output for the second segment of the data stream is generated from the first features and the second features based on the identified unchanged content and the identified changed content. To generate the feature output for the second segment of the data stream, gates can be used to determine how to generate the feature output. As discussed, a binary gate can be used to determine whether to use a previously computed feature from the first segment of the data stream for a given sub-segment (e.g., a given spatial area in an image) or whether to generate the feature output based on from features extracted from the second segment of the data stream and computed through a plurality of layers in a transformer neural network.

In some aspects, to generate the feature output for the second segment of the data stream, a binary gate can be used to select how each respective feature in the feature output is to be generated. When a first feature and a corresponding second feature are substantially identical, the first feature can be retained. Otherwise, the binary gate may trigger the generation of an output feature for the second feature using a transformer neural network. By doing so, temporal redundancy can be exploited in performing object detection or other computer vision tasks, as features need not be recomputed when such re-computation would not generate substantially different data and would waste compute resources.

In some aspects, to generate the feature output for the second segment of the data stream, a ternary gate can be used to select how each respective feature in the feature output is to be generated. For data that is spatially redundant, the ternary gate can output a zero state, as spatially redundant data may correspond to features that can be removed from the data stream without negatively impacting an object detection or other computer vision task. When a first feature and a corresponding second feature are substantially identical, the first feature can be retained. Otherwise, the binary gate may trigger the generation of an output feature for the second feature using a transformer neural network. Using a ternary gate, spatial and temporal redundancy may be exploited in performing object detection or other computer vision tasks, as features need not be computed for irrelevant data and need not be recomputed when such re-computation would not generate substantially different data and would waste compute resources.

At block 450, a plurality of objects are identified in the data stream based on the feature output for the second segment of the data stream. As discussed, to identify objects from the feature output for the second segment of the data stream, the feature output can be encoded into a latent space representation through an encoder neural network, and the latent space representation of the feature output can be decoded into one of a plurality of classifications using a decoder neural network. A feed-forward network can be used to determine whether a sub-segment of the second segment of the data stream corresponds to an object of interest, and if so, what kind of object is included in the sub-segment.

At block 460, one or more actions are taken based on identifying the plurality of objects in the data stream. For example, in an autonomous vehicle deployment, the actions taken based on identifying the plurality of objects in the data stream may include controlling a motor vehicle to avoid a collision with the identified objects, such as applying brakes to decelerate or stop the motor vehicle, accelerating the motor vehicle, and/or steering the motor vehicle around the identified objects. In some aspects, in a data compression example, levels of compression may be selected for each sub-segment of the second segment of the data stream based on whether the sub-segment corresponds to background data or an object of interest (e.g., in foreground data). Because background data may not be of interest, a higher degree of compression may be used to reduce the size of the background data. Generally, higher degrees of compression may correspond to higher amounts of information loss; thus, sub-segments corresponding to objects of interest may be compressed using lower degrees of compression (or lossless compression), so as to preserve visual details in data that may be considered "important" in the data stream.

Figure 5:
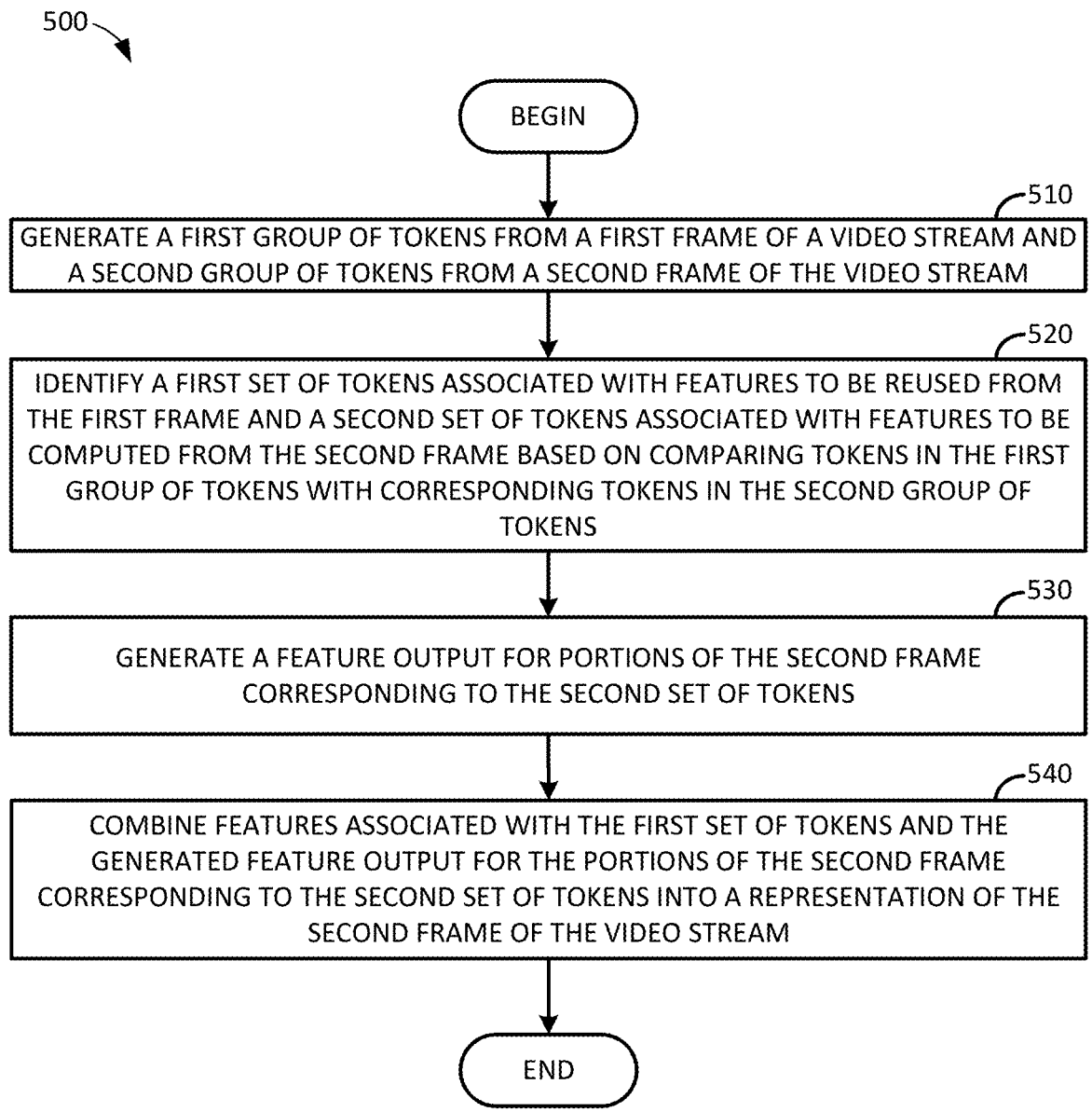
FIG. 5 depicts example operations for efficient processing of visual content using a gated transformer neural network, according to aspects of the present disclosure.

FIG. 5 illustrates example operations 500 for efficient processing of visual content using a gated transformer neural network, according to aspects of the present disclosure. Operations 500 may be performed, for example, by a computing device on which a gated transformer neural network (e.g., gated transformer neural network 300 illustrated in FIG. 3) is deployed for use in various computer vision tasks.

As illustrated, operations 500 begin at block 510, with generating a first group of tokens from a first frame of a video stream and a second group of tokens from a second frame of the video stream. Generally, each token in the first group of tokens may represent different spatial portions of the first segment of the data stream, and each token in the second group of tokens may represent different spatial portions of the second segment of the data stream. The first frame may be, for example, a frame captured at time t, and the second frame may be a frame having a later timestamp than the first frame (e.g., a frame captured at time t+1).

At block 520, operations 500 proceed with identifying a first set of tokens associated with features to be reused from the first frame and a second set of tokens associated with features to be computed from the second frame. Generally, to identify the first set of tokens and the second set of tokens, tokens in the first group of tokens can be compared to corresponding tokens in the second group of tokens (e.g., using a binary gate or ternary gate discussed above with respect to FIG. 3). Generally, a comparison between a token in the first group of features and a corresponding token in the second group of features may be used to determine a difference between a spatial area in the first frame and the corresponding spatial area in the second frame.

Various techniques may be used to identify changed and unchanged portions of the second frame in a video stream relative to the first frame of the video stream. For example, a difference between an averaged token value for a given spatial location and the token value for the given spatial location in the second frame of the video stream can be calculated. If the difference is outside a threshold level, it may be determined that the given spatial location includes changed content for which features are to be recomputed from the second frame through the transformer neural network. Otherwise, it may be determined that the given spatial location includes unchanged content. In another example, a difference between token values from the first frame of the video stream and corresponding token values from the second frame of the data stream can be analyzed. If the difference value for a given feature exceeds some threshold value, it can be determined that the given spatial location associated with the given token includes changed content; otherwise, it can be determined that the given spatial location associated with the given token includes unchanged content.

At block 530, operations 500 proceed with generating a feature output for portions of the second frame corresponding to the second set of tokens. Generally, to generate the feature output for each of these portions of the second frame corresponding to the second set of tokens, these portions of the second frame may be processed by a neural network trained to extract a feature representation from the data in these portions of the second frame.

At block 540, operations 500 proceed with combining features associated with the first set of tokens and the generated feature output for the portions of the second frame corresponding to the second set of tokens into a representation of the second frame of the video stream. Generally, the combination of these features may allow the features extracted from the first frame of the video stream and the second frame of the data stream to be combined so that a portion, but not the entirety, of the second frame is processed using a neural network, such as a transformer neural network. By doing so, temporal redundancies—that is, similarities between successive frames in the video content—and spatial redundancies—that is, similarities between different portions of the same frame—may both be leveraged in processing frames from a video stream.

In some aspects, the unchanged content and changed content may be content on different depth planes (e.g., background or foreground) in different frames. Unchanged content may be, for example, background content that is shared between a first frame of the video data stream and a second frame of the video data stream. Changed content, meanwhile, may be foreground content that changes between the first frame and the second frame.

In some aspects, to generate the feature output for the second segment of the data stream, gates can be used to determine how to generate the feature output. As discussed, a binary gate can be used to determine whether to use a previously computed feature from the first segment of the data stream for a given sub-segment (e.g., a given spatial area in an image) or whether to generate the feature output based on from features extracted from the second segment of the data stream and computed through a plurality of layers in a transformer neural network.

In some aspects, to generate the feature output for the second segment of the data stream, a binary gate can be used to select how each respective feature in the feature output is to be generated. When a first feature and a corresponding second feature are substantially identical, the first feature can be retained. Otherwise, the binary gate may trigger the generation of an output feature for the second feature using a transformer neural network. By doing so, temporal redundancy can be exploited in performing object detection or other computer vision tasks, as features need not be recomputed when such re-computation would not generate substantially different data and would waste compute resources.

In some aspects, to generate the feature output for the second segment of the data stream, a ternary gate can be used to select how each respective feature in the feature output is to be generated. For data that is spatially redundant, the ternary gate can output a zero state, as spatially redundant data may correspond to features that can be removed from the data stream without negatively impacting an object detection or other computer vision task. When a first feature and a corresponding second feature are substantially identical, the first feature can be retained. Otherwise, the binary gate may trigger the generation of an output feature for the second feature using a transformer neural network. Using a ternary gate, spatial and temporal redundancy may be exploited in performing object detection or other computer vision tasks, as features need not be computed for irrelevant data and need not be recomputed when such re-computation would not generate substantially different data and would waste compute resources.

The feature output can be used for various computer vision tasks. For example, a plurality of objects can be identified in the data stream based on the feature output for the second segment of the data stream. As discussed, to identify objects from the feature output for the second segment of the data stream, the feature output can be encoded into a latent space representation through an encoder neural network, and the latent space representation of the feature output can be decoded into one of a plurality of classifications using a decoder neural network. A feedforward network can be used to determine whether a sub-segment of the second segment of the data stream corresponds to an object of interest, and if so, what kind of object is included in the sub-segment.

One or more actions can then be taken based on identifying the plurality of objects in the data stream. For example, in an autonomous vehicle deployment, the actions taken based on identifying the plurality of objects in the data stream may include controlling a motor vehicle to avoid a collision with the identified objects, such as applying brakes to decelerate or stop the motor vehicle, accelerating the motor vehicle, and/or steering the motor vehicle around the identified objects. In some aspects, in a data compression example, levels of compression may be selected for each sub-segment of the second segment of the data stream based on whether the sub-segment corresponds to background data or an object of interest (e.g., in foreground data). Because background data may not be of interest, a higher degree of compression may be used to reduce the size of the background data. Generally, higher degrees of compression may correspond to higher amounts of information loss; thus, sub-segments corresponding to objects of interest may be compressed using lower degrees of compression (or lossless compression), so as to preserve visual details in data that may be considered "important" in the data stream.

Figure 6:
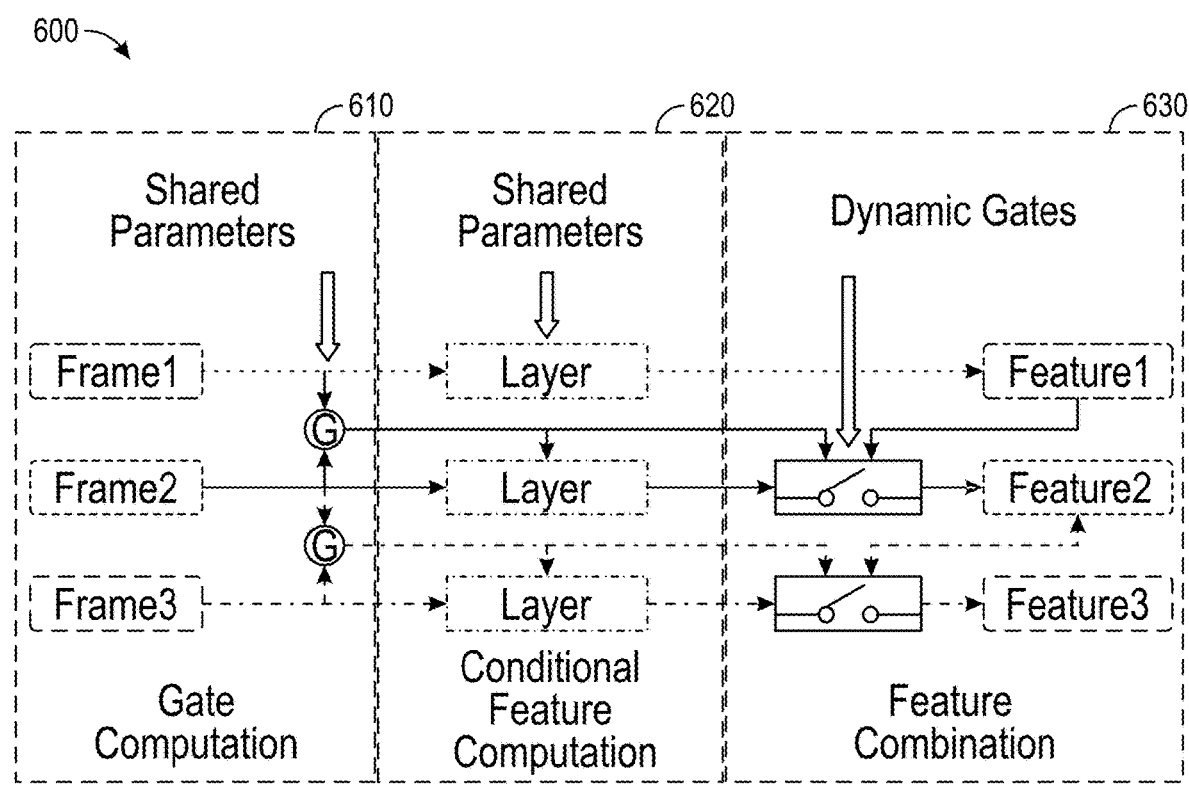
FIG. 6 depicts an example pipeline in which binary gates are used in a transformer neural network for efficient detection of objects in visual content, according to aspects of the present disclosure.

FIG. 6 depicts an example pipeline 600 in which binary gates are used in a transformer neural network for efficient detection of objects in visual content, according to aspects of the present disclosure.

As illustrated, pipeline 600 includes a gate computation stage 610, a conditional feature computation stage 620, and a feature combination stage 630. Generally, a first frame (designated "Frame1") may be an initial frame in captured video content and may be processed in full, without the use of gates to determine whether to compute a feature or use a previously computed feature from a previous frame in the captured video content. Thus, for Frame1, gate computation stage 610 may be omitted, and features may be computed from Frame1 (or tokens extracted from Frame1 representing each of a plurality of spatial segments of Frame1) using one or more linear projection layers (e.g., QKV projection layers used to generate query, key, and value matrices for Frame1). These features generated by the one or more linear projection layers may be output as features of Frame1.

For subsequent frames, a gate may be used to determine whether to compute a feature or to use a previously computed feature. Thus, for Frame1 and Frame2, tokens extracted from these frames may be input into a binary gate. For a specific feature, located at a specific spatial location in Frame1 and Frame2, the tokens may be compared at gate computation stage 610 to make a determination of whether a previously computed feature can be borrowed for the token or if the token is to be recomputed. If, at gate computation stage 610, it is determined that a token is to be recomputed, a feature may be generated through the one or more layers in conditional feature computation stage 620 for the token in Frame2. Otherwise, the feature for the token may be borrowed from a previous frame without further computation. At feature combination stage 630, a binary gate can be used to determine whether to output, in a feature output for Frame2, a previously computed feature for a token or a newly computed feature for that token.

Similarly, for Frame3, the gate computation stage 610 may determine whether a previously computed feature (e.g., from either Frame1 or Frame2) for a given token (e.g., spatial segment) can be used to represent a corresponding token in Frame3. If a previously computed feature can be used (e.g., temporal redundancy can be exploited) for a given token, the gate may generate a signal that blocks re-computation of the feature for that given token at conditional feature computation stage 620. Otherwise, the gate can generate a signal that triggers re-computation of the feature for that given token at feature computation stage 620. At feature combination stage 630, a binary gate can be used to output a previously computed feature for a token or a newly computed feature for that token. Generally, using these gates, features may be computed when a threshold amount of change has occurred, and need not be computed (e.g., may be shared from previous frames) until a sufficient change is detected between different frames that would cause a previously computed feature to no longer accurately represent the content of a given token (e.g., spatial segment) of a frame.

Figure 7:
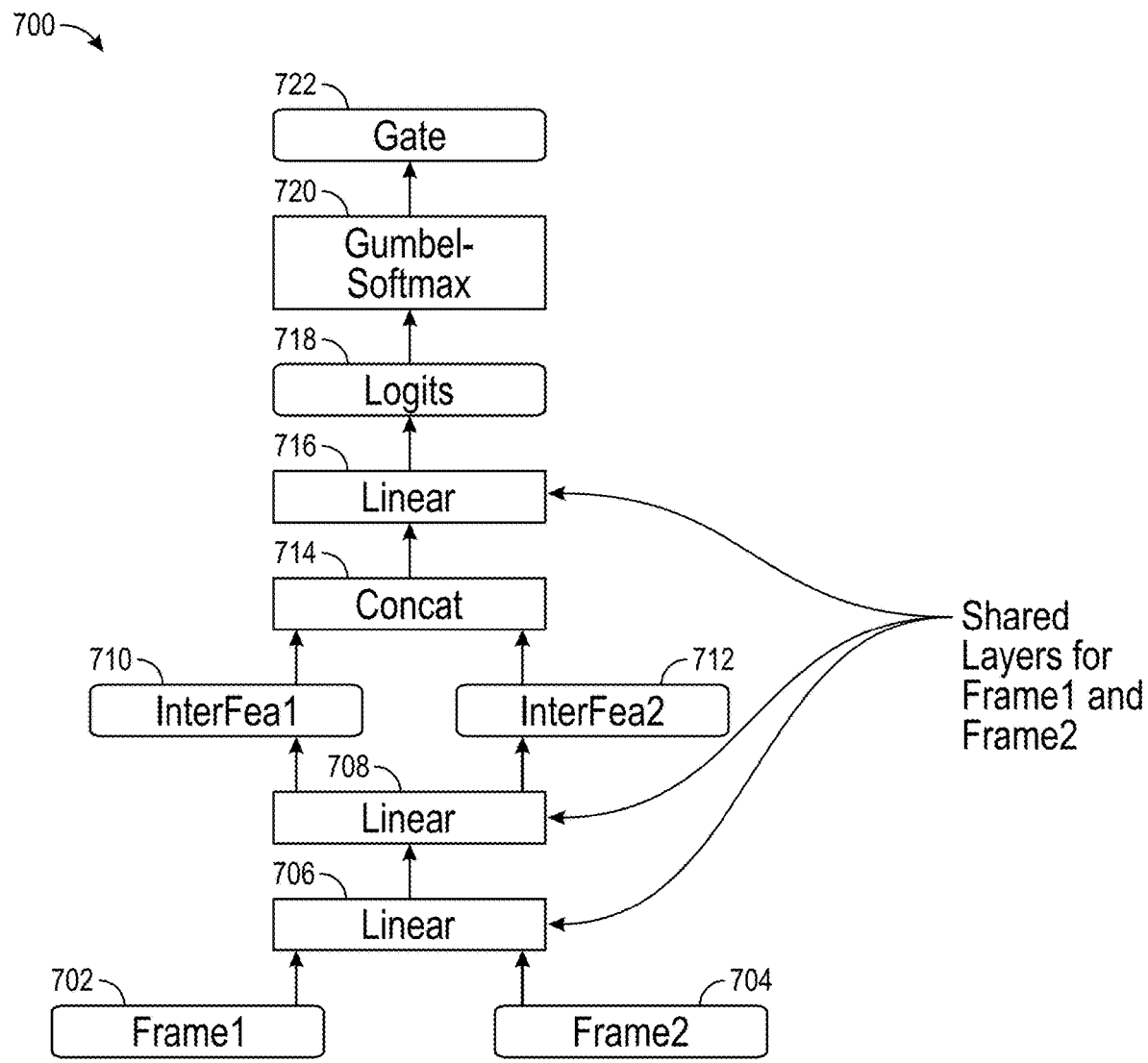
FIG. 7 depicts an example gate used to select a feature to include in a feature map used in detecting objects in visual content, according to aspects of the present disclosure.

FIG. 7 depicts an example gate 700 used to select a feature to include in a feature map used in detecting objects in visual content, according to aspects of the present disclosure. As illustrated, a first input frame 702 and a second input frame 704 may be input into linear projection layers 706 and 708 to generate intermediate features 710 and 712, respectively. Intermediate features 710 and 712 may be concatenated at concatenator 714 into a combined feature representation, and the combined feature representation of the first input frame 702 and the second input frame 704 may be input into a linear projection layer 716 to fuse the information from the first input frame 702 and the second input frame 704. The output of linear projection layer 716 may be logits 718, which may be a set of raw predictions that can be processed to determine whether to borrow a previously computed feature, compute a feature for a given token, or (if ternary gates are used) zero out a feature.

To train gate 722, a Gumbel softmax sampler may be applied to logits 718 generated by linear projection layer 716. For a binary gate, each logit, corresponding to a feature generated for a corresponding token in the first input frame 702 and the second input frame 704, may have one state for each token. Logits 718 may be represented by the vector:

$$S = (S_1, \ldots, S_i, \ldots, S_N)^T \qquad (8)$$

where $S \in \mathbb{R}^N$, i indexes the tokens, and T here indicates matrix transposition. A Sigmoid function:

$$Z = \text{Sigmoid}\left(\frac{S}{T}\right) \quad (9)$$

may be applied to logits 718, where T here is a temperature value (e.g., ⅔). A binary gate may be derived by thresholding the gate state Z based on a value of 0.5, such that the output G of the binary gate 722 for a given token i is represented by the equation:

$$G_i = \begin{cases} 1, & Z_i > 0.5 \\ 0, & Z_i \leq 0.5 \end{cases} \quad (10)$$

An output feature—and the output of gate 722—may thus be computed by selecting a feature from either the first input frame 702 or the second input frame 704, according to the equation:

$$X_g = X_p \circ (1-G) + X_c \circ G \quad (11)$$

where $X_p$ represents a feature from the first input frame 702 (i.e., a previous frame), $X_c$ represents a feature from the second input frame 704 (i.e., a current frame), $X_g$ represents the gated feature, and ∘ denotes a Hadamard product of two identically sized matrices. In some aspects, when G=0, $X_c$ need not be computed, which may achieve a reduction in computational expense in a neural network.

In some aspects, to sparsify a binary gate, an $L_1$ loss function can be minimized. The loss function may be represented by the equation:

$$\mathcal{L}_b = \frac{1}{L}\sum_{l=1}^{L}\frac{FLOP_l}{10^9}\gamma\,\text{mean}\left(Z^l\right) \quad (12)$$

where l is a layer index, γ is a regularization factor, and $FLOP_l$ represents the computational complexity of the layer with index l. Generally, the computational complexity of a layer may be calculated based on a number of mathematical operations (e.g., adds and multiplies) performed when generating an output of that layer for a given input of features from a segment of a data stream. By regularizing the loss term based on the computational complexity of the linear projection layers in a transformer neural network, balanced compression of the different layers may be achieved.

Figure 8:
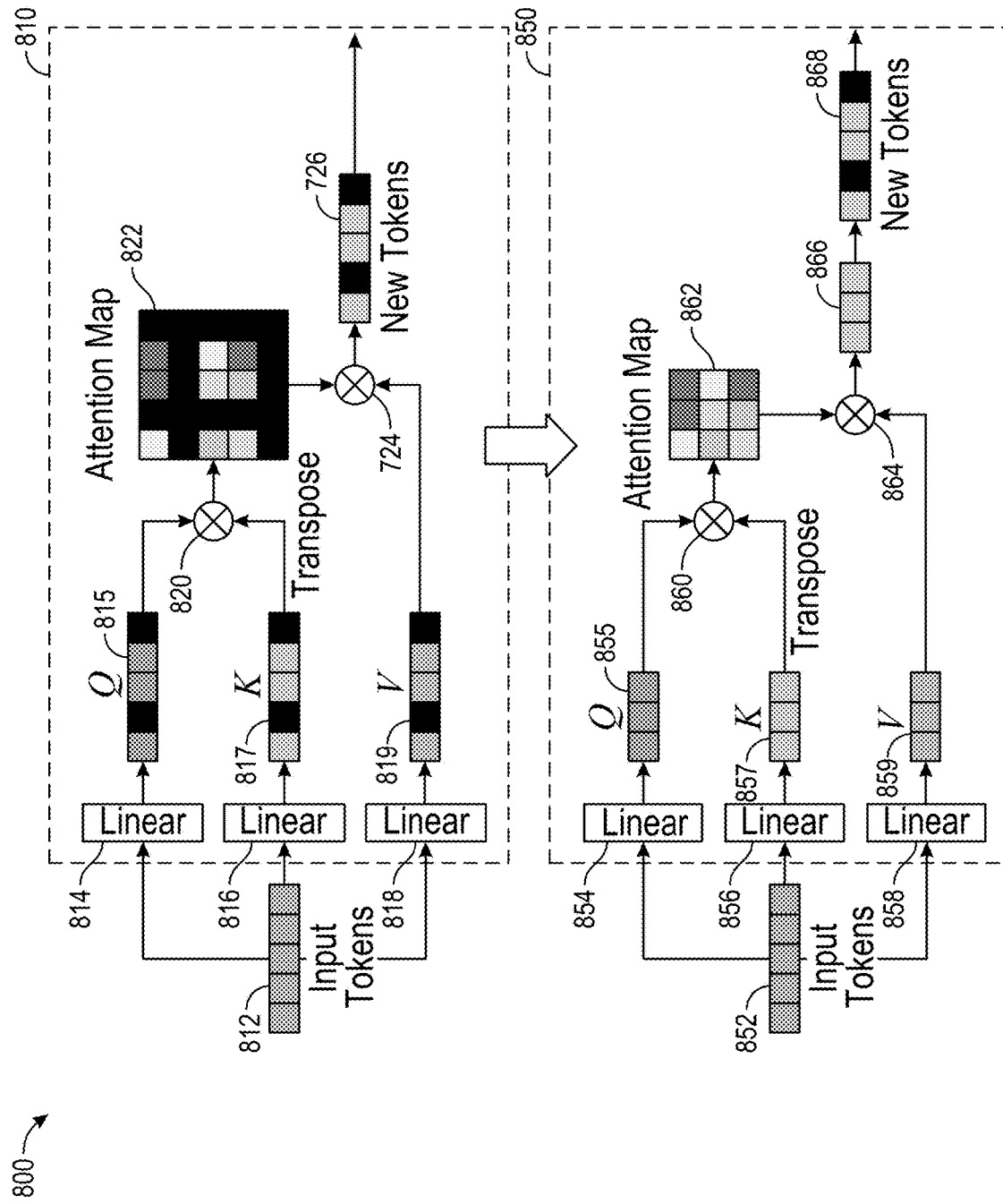
FIG. 8 depicts an example gated transformer neural network in which ternary gates are used to reduce the size of a feature map used for detecting objects in visual content, according to aspects of the present disclosure.

FIG. 8 depicts an example gated transformer neural network 800 in which ternary gates are used to reduce the size of a feature map used for detecting objects in visual content, according to aspects of the present disclosure. As illustrated, in block 810, ternary gates are used to reduce the size of the feature (attention) map representing a segment of a data stream (e.g., a frame in a stream of video content), and in block 850, this reduced feature map is used to reduce the computational complexity involved in processing a subsequent segment of the data stream and identifying objects and/or performing other computer vision tasks on this subsequent segment of the data stream.

As discussed above, ternary gates may be used for layers 814, 816, 818 (e.g., the QKV projection layers discussed above) used to generate query Q 815, key K 817, and values V 819 in a self-attention module. The architecture of the ternary gates may follow the architecture of gate 700 illustrated in FIG. 7 and discussed above. However, unlike a binary gate, a ternary gate used for layers 814, 816, and 818 may have three states: a zeroing state, a sharing state for using previously computed features from a previous segment of the data stream, and a computing state for generating a feature from the current segment of the data stream. The output logits of a final linear projection layer may thus be represented as:

$$S=[S_{:,1}, S_{:,2}, S_{:,}] \quad (13)$$

where $S \in \mathbb{R}^{N \times 3}$, $S_{:,i}$ represents the columns of S. For each token i, the three states $S_{:,1}, S_{:,2}, S_{:,}$ correspond to the zeroing state, sharing state, and computing state, respectively. In a zeroing state, a token may be replaced by a zero value, indicating that the token can be removed. Attention map 822 may be generated by combining query Q 815 and key K 817 at transposer 820. Thus, the attention computation at block 824, described above with respect to equation (4), may be performed on a smaller set of features. Computation on a smaller set of features may reduce computational expense, at the expense of a loss of information in the attention map 822 and in the attention map used to process subsequent segments in the data stream. Additionally, the set of new tokens 826 generated at block 810 may include computed tokens and zeroed tokens representing the output of a transformer neural network for a first segment of a data stream.

In block 850, as illustrated, input tokens 852 may be generated for a subsequent segment in the data stream and processed through linear projection layers 854, 856, and 858 to generate query Q 855, key K 857, and value V 859. Because certain features were zeroed out and removed at block 810 (in which a first frame was processed through a transformer neural network), query Q 855, key K 857, and value V 859 may be smaller in block 850 than query Q 815, key K 817, and value V 819 in block 810. Query Q 855 and key K 857 may be processed through transposer 860 to generate an attention map 862, which may also have a smaller size than attention map 822 in block 810 (which included zeroed values for a plurality of tokens). Values V 859 and attention map 862 may be combined into a set of tokens 866 through matrix multiplier 864. The set of tokens 866 may be expanded with the zeroed data to generate a set of new tokens 868 representing the subsequent segment of the data stream.

Similar to the binary gate discussed above, in a ternary gate used in gated transformer neural network 800, a softmax function may be applied to the output logits, according to Equation (9) discussed above. The value G of a ternary gate may be determined by comparing the values of the three states in the output logits described in Equation (13), according to the equation:

$$G_{i,j} = \begin{cases} 1, & G_{i,j} = \max_j G_{i,j} \\ 0, & \text{otherwise} \end{cases} \quad (14)$$

The final output feature of a ternary gate may thus be computed according to the equation:

$$X_g = X_p \circ (1-G_{:,1}) + X_c \circ G_{:,2} \quad (15)$$

A loss function for a ternary gate may be minimized to sparsify a ternary gate. The ternary gate may be trained, for example, to minimize a loss function represented by the equation:

$$\mathcal{L}_b = \frac{1}{L}\sum_{l=1}^{L} \frac{FLOP_l}{10^9}(\gamma_1 \text{ mean } (Z^l_{:,1}) + \gamma_2 \text{ mean } (Z^l_{:,2}) + \gamma_3 \text{ mean } (Z^l_{:,3})) \quad (16)$$

where l is a layer index, $\gamma_1$, $\gamma_2$, and $\gamma_3$ are regularization factors for the zeroing, sharing, and computing states, respectively, and $FLOP_l$ represents the computational complexity of the layer with index l. The $\gamma_1$, $\gamma_2$, and $\gamma_3$ regularization factors may be selected, for example, to balance the zero, sharing, and computing states so that a sufficient amount of data may remain to ensure the accuracy of object detection or other computer vision tasks.

Generally, aspects of the present disclosure may allow for significant reductions in the computational expense involved in object detection tasks with similar accuracy metrics. A gated transformer neural network, as discussed herein, may reduce the average computational workload by 40 percent with a similar accuracy, measured by a mean Intersection over Union (mIoU) metric. Further reductions in computational workload may be achieved with minimal decreases in accuracy relative to ungated transformer neural networks (e.g., DETR) discussed above.

Figure 9:
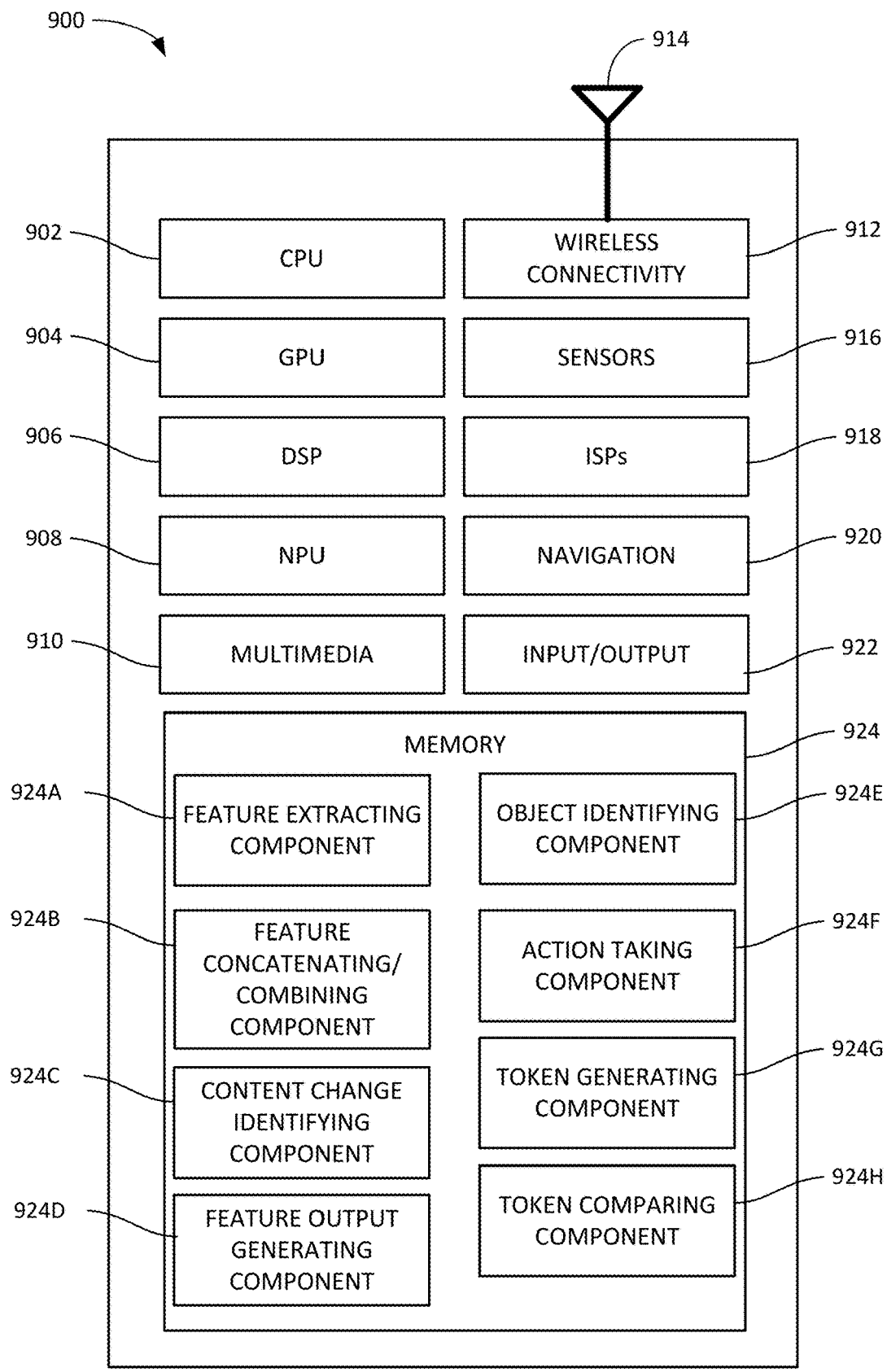
FIG. 9 depicts an example implementation of a device on which efficient detection of objects in visual content using gated transformer neural networks can be performed, according to aspects of the present disclosure.

Example Processing System for Efficient Processing of Visual Content Using Gated Transformer Neural Networks FIG. 9 depicts an example processing system 900 for processing visual content (e.g., for object detection or other computer vision tasks) using gated transformer neural networks (e.g., for object detection or other computer vision tasks), such as described herein for example with respect to FIG. 4 and FIG. 5.

Processing system 900 includes a central processing unit (CPU) 902, which in some examples may be a multi-core CPU. Instructions executed at the CPU 902 may be loaded, for example, from a program memory associated with the CPU 902 or may be loaded from a memory 924.

Processing system 900 also includes additional processing components tailored to specific functions, such as a graphics processing unit (GPU) 904, a digital signal processor (DSP) 906, a neural processing unit (NPU) 908, a multimedia processing unit 910, a multimedia processing unit 910, and a wireless connectivity component 912.

An NPU, such as NPU 908, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPUs 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process the new piece of data through an already trained model to generate a model output (e.g., an inference).

In one implementation, NPU 908 is a part of one or more of CPU 902, GPU 904, and/or DSP 906.

In some examples, wireless connectivity component 912 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 912 is further connected to one or more antennas 914.

Processing system 900 may also include one or more sensor processing units 916 associated with any manner of sensor, one or more image signal processors (ISPs) 918 associated with any manner of image sensor, and/or a navigation component 920, which may include satellite-based positioning system components (e.g., GPS or GLONASS) as well as inertial positioning system components.

Processing system 900 may also include one or more input and/or output devices 922, such as screens, touch-sensitive surfaces (including touch-sensitive displays), physical buttons, speakers, microphones, and the like.

In some examples, one or more of the processors of processing system 900 may be based on an ARM or RISC-V instruction set.

Processing system 900 also includes memory 924, which is representative of one or more static and/or dynamic memories, such as a dynamic random access memory, a flash-based static memory, and the like. In this example, memory 924 includes computer-executable components, which may be executed by one or more of the aforementioned processors of processing system 900.

In particular, in this example, memory 924 includes feature extracting component 924A, feature concatenating/combining component 924B, content change identifying component 924C, feature output generating component 924D, object identifying component 924E, action taking component 924F, token generating component 924G, and token comparing component 924H. The depicted components, and others not depicted, may be configured to perform various aspects of the methods described herein.

Generally, processing system 900 and/or components thereof may be configured to perform the methods described herein.

Notably, in other aspects, features of processing system 900 may be omitted, such as where processing system 900 is a server computer or the like. For example, multimedia processing unit 910, wireless connectivity component 912, sensor processing units 916, ISPs 918, and/or navigation component 920 may be omitted in other aspects. Further, features of processing system 900 may be distributed, such as training a model and using the model to generate inferences, such as user verification predictions.

Example Clauses

Implementation details are described in the following numbered clauses.

Clause 1: A method for detecting objects in a data stream using a machine learning model, comprising: extracting first features from a first segment of the data stream and second features from a second segment of the data stream; concatenating the first features and the second features into a combined representation of the first segment of the data stream and the second segment of the data stream; identifying unchanged content and changed content from the combined representation of the first segment of the data stream and the second segment of the data stream; generating a feature output for the second segment of the data stream from the first features and the second features based on the identified unchanged content and the identified changed content; identifying, using a transformer neural network, a plurality of objects in the data stream based on the feature output for the second segment of the data stream; and taking one or more actions based on identifying the plurality of objects in the data stream.

Clause 2: The method of Clause 1, wherein: the data stream comprises a video data stream having a plurality of frames, the first segment of the data stream comprises a first frame of the plurality of frames in the video data stream, and the second segment of the data stream comprises a second frame of the plurality of frames in the video data stream, the second frame having a later timestamp than the first frame.

Clause 3: The method of Clause 2, wherein: the unchanged content comprises background content in the first frame and the second frame, and the changed content comprises foreground content in the first frame and the second frame.

Clause 4: The method of any of Clauses 1 through 3, wherein: extracting the first features from the first segment of the data stream comprises generating, for each respective sub-segment of the first segment of the data stream, a feature representation of data in the respective sub-segment of the first segment of the data stream, extracting the second features from the second segment of the data stream comprises generating, for each respective sub-segment of the second segment of the data stream a feature representation of data in the respective sub-segment of the second segment of the data stream, and each respective sub-segment of the first segment of the data stream corresponds to a sub-segment of the second segment of the data stream in a same spatial location in the data stream.

Clause 5: The method of any of Clauses 1 through 4, wherein generating the feature output for the second segment of the data stream comprises, for each respective feature of the first features and the second features: retaining the respective feature from the first features when the respective feature from the first features is identical to a corresponding feature from the second features; and generating, through the transformer neural network, an output feature for the respective feature of the second features when the respective feature from the first features is different from the corresponding feature from the second features.

Clause 6: The method of Clause 5, wherein generating the feature output for the second segment of the data stream comprises generating the feature output through a binary gate trained to minimize a loss function as a function of computational complexity of each of a plurality of layers used to generate the first features and the second features.

Clause 7: The method of any of Clauses 1 through 6, wherein generating the feature output for the second segment of the data stream comprises, for each respective feature of the first features and the second features: outputting a zero state based on a determination that the respective feature corresponds to removable data in the data stream; retaining the respective feature from the first features when the respective feature from the first features is identical to a corresponding feature from the second features; and generating, through the transformer neural network, an output feature for the respective feature of the second features when the respective feature from the first features is different from the corresponding feature from the second features.

Clause 8: The method of Clause 7, wherein generating the feature output for the second segment of the data stream comprises generating the feature output through a ternary gate trained to minimize a loss function as a function of computational complexity of each of a plurality of layers used to generate the first features and the second features and regularization factors for each of the zero state, a sharing state in which the first features are identical to the second features, and a computing state when the first features are different from the second features.

Clause 9: A method for processing a video stream using a machine learning model, comprising: generating a first group of tokens from a first frame of the video stream and a second group of tokens from a second frame of the video stream; identifying a first set of tokens associated with features to be reused from the first frame and a second set of tokens associated with features to be computed from the second frame based on a comparison of tokens from the first group of tokens to corresponding tokens in the second group of tokens; generating a feature output for portions of the second frame corresponding to the second set of tokens; and combining features associated with the first set of tokens with the generated feature output for the portions of the second frame corresponding to the second group of tokens into a representation of the second frame of the video stream.

Clause 10: The method of Clause 9, wherein the second frame of the video stream comprises a frame having a later timestamp than the first frame.

Clause 11: The method of Clause 9 or 10, wherein: the first set of tokens corresponds to unchanged content in the first frame and the second frame, and the second set of tokens corresponds to changed content in the first frame and second frame.

Clause 12: The method of Clause 11, wherein: the unchanged content comprises background content in the first frame and the second frame, and the changed content comprises foreground content in the first frame and the second frame.

Clause 13: The method of any of Clauses 9 through 12, wherein: generating the first group of tokens comprises generating, for each respective sub-segment of the first frame of the video stream, a representation of data in the respective sub-segment of the first frame of the video stream, generating the second group of tokens comprises generating, for each respective sub-segment of the second frame of the video stream a feature representation of data in the respective sub-segment of the second frame of the video stream, and each respective sub-segment of the first frame of the video stream corresponds to a sub-segment of the second frame of the video stream in a same spatial location.

Clause 14: The method of any of Clauses 9 through 13, wherein the first set of tokens and the second set of tokens are identified by inputting the first group of tokens and the second group of tokens through a binary gate trained to minimize a loss function as a function of computational complexity of each of a plurality of layers used to generate the features associated with the first set of tokens and the feature output generated for the portions of the second frame corresponding to the second group of tokens.

Clause 15: The method of any of Clauses 9 through 14, further comprising identifying a third group of tokens corresponding to removable data in the video stream, wherein the feature output excludes features corresponding to the third group of tokens.

Clause 16: The method of Clause 15, wherein the first group of tokens, the second group of tokens, and the third group of tokens are identified through a ternary gate trained to minimize a loss function as a function of computational complexity of each of a plurality of layers used to generate the features associated with the first set of tokens and the feature output generated for the portions of the second frame corresponding to the second group of tokens and regularization factors for each of a zero state, a sharing state in which tokens in the first group of tokens are identical to corresponding tokens in the second group of tokens, and a computing state in which tokens in the first group of tokens are different from tokens in the second group of tokens.

Clause 17: A processing system comprising: a memory comprising computer-executable instructions and one or more processors configured to execute the computer-executable instructions and cause the processing system to perform a method in accordance with any of Clauses 1 through 16.

Clause 18: A processing system comprising means for performing a method in accordance with any of Clauses 1 through 16.

Clause 19: A non-transitory computer-readable medium comprising computer-executable instructions that, when executed by one or more processors of a processing system, cause the processing system to perform a method in accordance with any of Clauses 1 through 16.

Clause 20: A computer program product embodied on a computer-readable storage medium comprising code for performing a method in accordance with any of Clauses 1 through 16.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method for processing a video stream using a transformer neural network, the method comprising:
    obtaining, at a transformer neural network, a first group of tokens from a first frame of the video stream and a second group of tokens from a second frame of the video stream;

based on a comparison of tokens from the first group of tokens to corresponding tokens in the second group of tokens:
  identifying a first set of tokens associated with first features to be reused from the first frame; and
  identifying a second set of tokens associated with second features to be computed from the second frame;
computing, at the transformer neural network, the second features, wherein the computing the second features comprises:
  converting, using a plurality of linear projection layers of a self-attention module of the transformer neural network, only the second set of tokens to queries, keys, and values;
  generating an attention map based on a combination of the queries and the keys;
  generating a first output set of tokens based on a combination of the attention map and the values; and
  processing the first output set of tokens at an output projection layer of the self-attention module to generate a second output set of tokens; and
combining the first features associated with the first set of tokens with the second features associated with the second group of tokens into a representation of the second frame of the video stream.

2. The method of claim 1, wherein the second frame of the video stream comprises a frame having a later timestamp than the first frame.

3. The method of claim 1, wherein:
the first set of tokens corresponds to unchanged content in the first frame and the second frame; and
the second set of tokens corresponds to changed content in the first frame and second frame.

4. The method of claim 3, wherein:
the unchanged content comprises background content in the first frame and the second frame; and
the changed content comprises foreground content in the first frame and the second frame.

5. The method of claim 1, further comprising:
generating the first group of tokens, wherein generating the first group of tokens comprises generating, for each respective sub-segment of the first frame of the video stream, a representation of data in the respective sub-segment of the first frame of the video stream; and
generating the second group of tokens, wherein generating the second group of tokens comprises generating, for each respective sub-segment of the second frame of the video stream a feature representation of data in the respective sub-segment of the second frame of the video stream, and wherein each respective sub-segment of the first frame of the video stream corresponds to a sub-segment of the second frame of the video stream in a same spatial location.

6. The method of claim 1, wherein the first set of tokens and the second set of tokens are identified by inputting the first group of tokens and the second group of tokens through a binary gate trained to minimize a loss function as a function of computational complexity of each of a plurality of layers used to generate first the features associated with the first set of tokens and the feature output generated for the second features associated with the second group of tokens.

7. The method of claim 1, further comprising identifying a third group of tokens corresponding to removable data in the video stream, wherein the feature output excludes features corresponding to the third group of tokens.

8. The method of claim 7, wherein the first group of tokens, the second group of tokens, and the third group of tokens are identified through a ternary gate trained to minimize a loss function as a function of computational complexity of each of a plurality of layers used to generate the first features associated with the first set of tokens and the feature output generated for the second features associated with the second group of tokens and regularization factors for each of a zero state, a sharing state in which tokens in the first group of tokens are identical to corresponding tokens in the second group of tokens, and a computing state in which tokens in the first group of tokens are different from tokens in the second group of tokens.

9. A system for processing a video stream using a transformer neural network, the system comprising:
memory having computer-executable instructions stored thereon; and
one or more processors configured to execute the computer-executable instructions to cause the system to:
  obtain, at a transformer neural network, a first group of tokens from a first frame of the video stream and a second group of tokens from a second frame of the video stream;
  based on a comparison of tokens from the first group of tokens to corresponding tokens in the second group of tokens:
    identify a first set of tokens associated with first features to be reused from the first frame; and
    identify a second set of tokens associated with second features to be computed from the second frame;
  compute, at the transformer neural network, the second features, wherein the one or more processors being configured to cause the system to compute the second features comprises one or more processors being configured to cause the system to:
    convert, using a plurality of linear projection layers of a self-attention module of the transformer neural network, only the second set of tokens to queries, keys, and values;
    generate an attention map based on a combination of the queries and the keys;
    generate a first output set of tokens based on a combination of the attention map and the values; and
    process the first output set of tokens at an output projection layer of the self-attention module to generate a second output set of tokens; and
  combine the first features associated with the first set of tokens with the second features associated with the second group of tokens into a representation of the second frame of the video stream.

10. The system of claim 9, wherein the second frame of the video stream comprises a frame having a later timestamp than the first frame.

11. The system of claim 9, wherein:
the first set of tokens corresponds to unchanged content in the first frame and the second frame; and
the second set of tokens corresponds to changed content in the first frame and second frame.

12. The system of claim 11, wherein:
the unchanged content comprises background content in the first frame and the second frame; and
the changed content comprises foreground content in the first frame and the second frame.

13. The system of claim 9, wherein:
the one or more processors are further configured to cause the system to generate the first group of tokens, wherein in order to generate the first group of tokens, the one or more processors are configured to cause the system to generate, for each respective sub-segment of the first frame of the video stream, a representation of data in the respective sub-segment of the first frame of the video stream;
the one or more processors are further configured to cause the system to generate the second group of tokens, wherein in order to generate the second group of tokens, the one or more processors are configured to cause the system to generate, for each respective sub-segment of the second frame of the video stream a feature representation of data in the respective sub-segment of the second frame of the video stream; and
each respective sub-segment of the first frame of the video stream corresponds to a sub-segment of the second frame of the video stream in a same spatial location.

14. The system of claim 9, wherein the first set of tokens and the second set of tokens are identified by inputting the first group of tokens and the second group of tokens through a binary gate trained to minimize a loss function as a function of computational complexity of each of a plurality of layers used to generate the first features associated with the first set of tokens and the feature output generated for the second features associated with the second group of tokens.

15. The system of claim 9, wherein the one or more processors are further configured to cause the system to identify a third group of tokens corresponding to removable data in the video stream, wherein the feature output excludes features corresponding to the third group of tokens.

16. The system of claim 15, wherein the first group of tokens, the second group of tokens, and the third group of tokens are identified through a ternary gate trained to minimize a loss function as a function of computational complexity of each of a plurality of layers used to generate the first features associated with the first set of tokens and the feature output generated for the second features associated with the second group of tokens and regularization factors for each of a zero state, a sharing state in which tokens in the first group of tokens are identical to corresponding tokens in the second group of tokens, and a computing state in which tokens in the first group of tokens are different from tokens in the second group of tokens.

17. A processing system for processing a video stream using a transformer neural network, the processing system comprising:
means for obtaining, at a transformer neural network, a first group of tokens from a first frame of the video stream and a second group of tokens from a second frame of the video stream;
means for identifying, based on a comparison of tokens from the first group of tokens to corresponding tokens in the second group of tokens, a first set of tokens associated with first features to be reused from the first frame;
means for identifying, based on the comparison of tokens from the first group of tokens to corresponding tokens in the second group of tokens, a second set of tokens associated with second features to be computed from the second frame;
means for computing, at the transformer neural network, the second features associated with the second set of tokens; and
means for combining the first features associated with the first set of tokens with the second features associated with the second group of tokens into a representation of the second frame of the video stream.

18. The processing system of claim 17, wherein the second frame of the video stream comprises a frame having a later timestamp than the first frame.

19. The processing system of claim 17, wherein:
the first set of tokens corresponds to unchanged content in the first frame and the second frame; and
the second set of tokens corresponds to changed content in the first frame and second frame.

20. The processing system of claim 19, wherein:
the unchanged content comprises background content in the first frame and the second frame; and
the changed content comprises foreground content in the first frame and the second frame.

21. The processing system of claim 17, further comprising:
means for generating the first group of tokens, wherein the means for generating the first group of tokens comprises means for generating, for each respective sub-segment of the first frame of the video stream, a representation of data in the respective sub-segment of the first frame of the video stream; and
means for generating the second group of tokens, wherein the means for generating the second group of tokens comprises means for generating, for each respective sub-segment of the second frame of the video stream a feature representation of data in the respective sub-segment of the second frame of the video stream, and wherein each respective sub-segment of the first frame of the video stream corresponds to a sub-segment of the second frame of the video stream in a same spatial location.

22. The processing system of claim 17, wherein the means for identifying the first set of tokens and the means for identifying the second set of tokens comprises means for inputting the first group of tokens and the second group of tokens through a binary gate trained to minimize a loss function as a function of computational complexity of each of a plurality of layers used to generate the first features associated with the first set of tokens and the feature output generated for the second features associated with the second group of tokens.

23. The processing system of claim 17, further comprising means for identifying a third group of tokens corresponding to removable data in the video stream, wherein the feature output excludes features corresponding to the third group of tokens.

24. The processing system of claim 23, wherein the means for identifying the first group of tokens, the means for identifying the second group of tokens, and the means for identifying the third group of tokens comprises a ternary gate trained to minimize a loss function as a function of computational complexity of each of a plurality of layers used to generate the first features associated with the first set of tokens and the feature output generated for the second features associated with the second group of tokens and regularization factors for each of a zero state, a sharing state in which tokens in the first group of tokens are identical to corresponding tokens in the second group of tokens, and a computing state in which tokens in the first group of tokens are different from tokens in the second group of tokens.

25. A non-transitory computer-readable medium having instructions stored thereon which, when executed by a processor, cause the processor to perform an operation for processing a video stream using a transformer neural network, the operation comprising:
obtaining, at a transformer neural network, a first group of tokens from a first frame of the video stream and a second group of tokens from a second frame of the video stream;
based on a comparison of tokens from the first group of tokens to corresponding tokens in the second group of tokens:
identifying a first set of tokens associated with first features to be reused from the first frame; and
identifying a second set of tokens associated with second features to be computed from the second frame;
computing, at the transformer neural network, the second features associated with the second set of tokens, wherein the computing the second features comprises:
converting, using a plurality of linear projection layers of a self-attention module of the transformer neural network, only the second set of tokens to queries, keys, and values;
generating an attention map based on a combination of the queries and the keys;
generating a first output set of tokens based on a combination of the attention map and the values; and
processing the first output set of tokens at an output projection layer of the self-attention module to generate a second output set of tokens; and
combining the first features associated with the first set of tokens with the second features associated with the second group of tokens into a representation of the second frame of the video stream.

26. The method of claim 1, wherein the combining the first features associated with the first set of tokens with the second features associated with the second group of tokens comprises combining the first set of tokens with the second output set of tokens to generate a third output set of tokens.

27. The method of claim 26, further comprising processing the third output set of tokens using a feed-forward network of the transformer neural network to generate the representation of the second frame of the video stream.

28. The method of claim 27, wherein a binary or ternary gate is coupled with the feed-forward network, the output projection layer of the self-attention module, and the plurality of linear projection layers of the self-attention module.

29. The processing system of claim 17, wherein the means for computing the second features comprises: means for converting, using a plurality of linear projection layers of a self-attention module of the transformer neural network, only the second set of tokens to queries, keys, and values; means for generating an attention map based on a combination of the queries and the keys; means for generating a first output set of tokens based on a combination of the attention map and the values; and means for processing the first output set of tokens at an output projection layer of the self-attention module to generate a second output set of tokens.

* * * * *